United States Patent [19]

Ermacora et al.

[11] Patent Number: 4,947,629
[45] Date of Patent: Aug. 14, 1990

[54] MOWER

[75] Inventors: Rino Ermacora; Horst Neuerburg, both of Saverne, France

[73] Assignee: Kuhn s.a., Saverne, France

[21] Appl. No.: 268,299

[22] Filed: Nov. 7, 1988

Related U.S. Application Data

[63] Continuation of Ser. No. 123,292, Nov. 18, 1987, Pat. No. 4,833,868, which is a continuation of Ser. No. 751,879, Jul. 5, 1985, Pat. No. 4,720,964.

[30] Foreign Application Priority Data

Jul. 6, 1984 [FR]  France ............................... 84 10916

[51] Int. Cl.⁵ ............................................. A01D 34/66
[52] U.S. Cl. ........................................... 56/13.6; 56/6
[58] Field of Search ...................................... 56/6, 13.6

[56] References Cited

U.S. PATENT DOCUMENTS

| 4,157,004 | 6/1979 | Van der Lely | 56/13.6 |
| 4,227,365 | 10/1980 | Van der Lely et al. | 56/6 |
| 4,476,666 | 10/1984 | Van der Lely et al. | 56/13.6 |
| 4,662,159 | 5/1987 | Muller | 56/13.6 |

FOREIGN PATENT DOCUMENTS

| 1225319 | 3/1971 | United Kingdom | 56/13.6 |
| 2059236 | 4/1981 | United Kingdom | 56/13.6 |

Primary Examiner—John Weiss
Attorney, Agent, or Firm—Oblon, Spivak, McClelland, Maier & Neustadt

[57] ABSTRACT

A mower having a plurality of rotary cutting elements each of which is provided with at least one cutting tool. At least one of the rotary cutting element is driven by a transmission means housed in a housing located under the rotary cutting elements. The housing is composed of cases in which the rotary cutting elements are guided in rotation, and a brace element determines the distance between each two adjacent cases. The housing is made up of at least one module formed by a case and a brace element formed integrally with the case. The front edge of each of said brace elements is pointed over at least a part of its length. At least said at least one rotary cutting element is mounted on a shaft guided in rotation in the bore of a bearing cylinder. The outside surface of said bearing cylinder comprises a first zone of a certain diameter which cooperates with a part of said at least one rotary cutting element to form a baffle and a second zone which is adjacent to said first zone and which has a diameter smaller than the diameter of said first zone. Further, the smallest diameter of the bore of said bearing cylinder is greater than the outside diameter of a power transmission means fastened to said shaft.

38 Claims, 6 Drawing Sheets

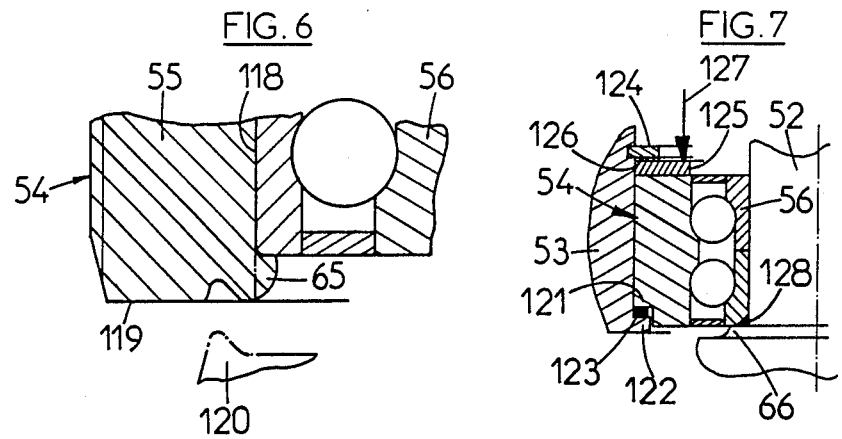
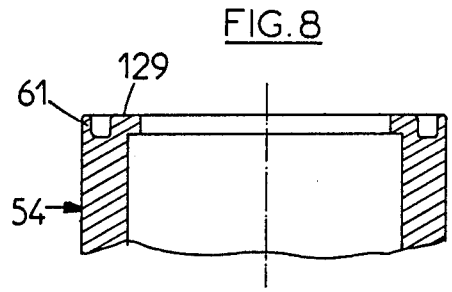
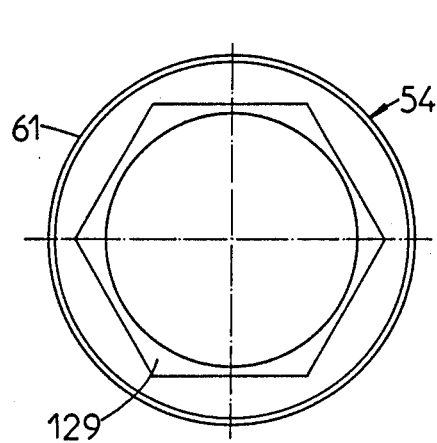

MOWER

This is a continuation, of application Ser. No. 07/123,292, filed Nov. 18, 1987, now Pat. No. 4,833,868, which is a continuation of 06/751,879 filed July 5, 1985.

BACKGROUND OF THE INVENTION

FIELD OF INVENTION

This invention relates to a mower comprising a plurality of rotary cutting elements each of which is provided with at least one cutting tool. At least one of the rotary cutting elements is driven by transmission means housed in a housing located under the rotary cutting elements.

DISCUSSION OF THE BACKGROUND

Mowers are known having a housing which is located under the rotary cutting elements In these mowers, the rotary cutting elements are guided in rotation in individual cases around an axis which is directed upwardly, and brace elements determine the distance between each two adjacent cases.

These known mowers have the advantage of having a housing of a very advantageous design. The modular character of the design of the housing makes it possible to produce mowers of different working widths while reducing to a minimum or even eliminating parts specific to each working width. Production of such mowers therefore is very easy and makes it possible to produce a whole range of mowers at a very advantageous cost.

However, the known mowers have certain drawbacks. Since the housing is formed by cases and brace elements, connections must be made between the various cases and various brace elements to obtain the desired working width. This requires more or less complex machinings at the location of each connection and, depending on the mode of assembly also more or less complex assembly elements. These machinings and these assembly elements substantially increase the cost of the housing. Moreover, at the location of each connection, the housing exhibits a more or less fragile zone in regard to the stresses that the housing must bear during working.

Additionally, the known mowers exhibit certain details in design that make them more expensive than is desirable and/or make operation hazardous.

OBJECT OF THE INVENTION

The principal object of this invention is to minimize the drawbacks of the known mowers described above.

SUMMARY OF THE INVENTION

With the foregoing in mind, the mower according to this invention is characterized in that its housing comprises at least one module formed by a case and a brace element in a single piece.

With this arrangement according to the invention, the number of connections is reduced. Consequently, the number of machinings of assembly elements and of fragile zones is also reduced.

Since the module is made up of a case and a brace element, it is possible to make mowers that have either an even or an odd number of rotary cutting elements. This makes it possible to create a whole range of mowers with a well staggered working width, depending on the needs of the market.

According to an additional characteristic of the invention, the brace element of a module is located on one and the same side. Advantageously, the brace element of a module is located on the left (with respect to the direction of the work) of the case which is part of the same module.

With this arrangement it is assured that the last module (i.e., the module located at the end of the housing farthest from the tractor to which the mower is hitched) does not extend beyond the cutting zone of the rotary cutting element located at that end.

According to another characteristic of the invention, the case of a module comprises a bearing cylinder the axis of which is directed upwardly and corresponds to the axis of rotation of the corresponding rotary cutting element. The bearing cylinder is an integral part of the module. Thus, the creation of an assembly between the bearing cylinder and the rest of the module is avoided. This makes it possible to lower the cost of the module, since machinings on the bearing cylinder and the rest of the module are eliminated, as well as the connecting elements which such an assembly would have required Advantageously, the axis of rotation of the corresponding rotary cutting element is located near the front edge of the module. Thereby, as seen from above, the common surface swept by the cutting tools of two adjacent rotating cutting elements extends far ahead of the front edge of the module.

According to another characteristic of the invention, two adjacent modules are centered in relation to one another. This arrangement makes it possible to cause the centering means to absorb a part of the bending stresses that are exerted on the cutter bar. On the other hand, the assembly elements which connect two adjacent modules to one another are kept from too great stresses. Further, it is assured, in case the transmission means housed in the housing comprise a transmission shaft, that the transmission shaft does not exhibit an initial deformation.

According to an additional characteristic of the invention, at a end the module has a flange or equivalent means. The flanges permit the assembly elements to have a sufficient width to enable them to resist the stresses to which they are subjected during working and during transport.

According to an additional characteristic of the invention, so that the housing will not be unduly sensitive to jams caused by accumulation of dirt that sticks on its front edge (particularly in the zone above which the cutting tools pass during their rotation), at least a part of the lower face of the brace element is located a distance from the ground. As a result, the dirt and/or plant debris that would otherwise collect at the front of the housing are allowed to pass under the housing.

According to another characteristic of the invention, to offer the smallest possible surface to which the dirt and/or plant debris could stick if their evacuation under the housing is not performed fast enough, the front edge of the brace element is relatively pointed over at least a part of its length.

To enable the dirt and/or plant debris to slide freely to the passage existing between the ground and the lower face of the brace element, the front edge of the brace element exhibits, over at least a part of its length, an inclined surface directed backwardly and downwardly.

According to an additional characteristic of the invention, the front edge of the brace element exhibits, at least in the zone above which the cutting tools pass during their rotation, a surface inclined backwardly and upwardly. This characteristic makes it possible to limit the damage of the transmission means, for example, which can be caused by the impact of a downwardly deformed cutting tool when it strikes the front edge of the housing. With this arrangement of the brace elements, the intensity of such an impact can be attenuated. Moreover, it is possible, thanks to the inclined surface, to at least partly straighten a downwardly deformed cutting tool.

To enable the housing to resist impacts caused by a downwardly deformed tool striking the housing, the front edge of the brace element exhibits (at least in its upper part and at least in the zone above which the cutting tools pass during their rotation) a thickness of material greater than the rest of the section of the brace element in a plane perpendicular to the longitudinal axis of the housing.

When a downwardly bent cutting tool is not straightened entirely by contact with the front edge of the brace element, the downwardly bent cutting tool also strikes the back edge of the adjacent module in the zone above which it passes during its rotation. To attenuate the impact in this case, the back edge of the brace element, at least in the zone above which the cutting tool passes during its rotation, has an inclined surface directed forwardly and upwardly.

As for the front edge, the thickness of the material in this zone is also greater than in the rest of the cross section of the brace element. This greater thickness of material is provided at least in the upper part of the back edge of the brace element.

According to another characteristic of the invention, the outside surface of the bearing cylinder comprises a first zone of a certain diameter that cooperates with a part of the rotary cutting element to form a baffle and a second zone with a diameter smaller than the diameter of the first zone. With this characteristic, there is a substantial reduction in the risk of winding and introducing blades of fodder or any string-like object (such as twine that might litter the field where the mower is operating). As is well known, winding and introduction of such objects can cause considerable damage to the bearings which guide the shaft of the rotary cutting elements in rotation.

According to a preferred embodiment of the invention, the length of the second zone is relatively great.

According to an additional preferred embodiment of the invention, the lower surface of the cutting element which delimits the bottom of the part of the cutting element forming a baffle with the first zone of the bearing cylinder extends approximately to the vicinity of the boundary between the first and second zones of the bearing cylinder, and preferably extends slightly higher than the boundary. Also advantageously, the lower surface extends outwardly and upwardly from the vicinity of the boundary.

According to another characteristic of the invention, the shaft of a rotary cutting element is guided in rotation by a bearing housed in the bore of the bearing cylinder of the case supporting that rotary cutting element, and the smallest diameter of the bore of the bearing cylinder is greater than the outside diameter of the power transmission means fastened to the shaft. With this characteristic, it is possible to disassemble the shaft of a rotary cutting element and the corresponding power transmission means fastened to the shaft without its being necessary to disassemble the housing entirely and even though the bearing cylinder is an integral part of the case. Therefore, it is thus possible to perform very quick interventions for maintenance and repair, which is of major importance during the harvest period when losses of time are not tolerable.

According to an additional characteristic of the invention, the assembly comprises means which allow an approximately continuous adjustment of the operating play of the power transmission means. The power transmission means may, for instance, comprise pairs of gear wheels. With this characteristic, it is possible to adjust the operating play of the power transmission means precisely without increasing assembly costs. A precise adjustment of the operating play results in a longer life of the power transmission means and in a reduction of the noise level during operation of the mower.

According to an embodiment of the invention, the means that make this adjustment possible consist of at least one element which is deformed during assembly of the bearing in the bearing cylinder.

According to another embodiment of the invention, each bearing comprises on its outside surface at least one threaded part which cooperates with a threaded part in the bore of the bearing cylinder. This latter embodiment makes it possible to have a considerable range of adjustment. The adjustment is finer the finer the pitch of the threading.

Advantageously, the outside surface of the bearing includes an unthreaded part which is centered in an unthreaded part of the bearing cylinder. This arrangement makes it possible to have a good centering of the shaft of the rotary cutting element in the bearing cylinder.

According to a preferred embodiment of the invention, the unthreaded parts of the bearing and of the bearing cylinder contact each other before the threaded parts of the bearing and the bearing cylinder begin to engage one another. This arrangement enables the bearing to be easily screwed into the bearing cylinder. Since the bearing is already centered in the bearing cylinder before the screwing begins, any groping to bring the threaded part of the bearing and the threaded part of the bearing cylinder opposite one another so that the screwing can be performed effectively is eliminated.

Moreover, the threaded parts of the bearing and of the bearing cylinder are so designed that they cannot engage one another when, during assembly, the transmission means (such as the pairs of gear wheels, for example) are not engaged. This characteristic is very advantageous at the assembly level, since it makes it possible to use screw driving machines without risk of locking the bearing in the bearing cylinder when the transmission means are not engaged. This characteristic therefore reduces risks in assembly and correlatively also reduces assembly cost.

According to an additional characteristic of the invention, after assembly of the bearings and the bearing cylinders, means block the relative rotation between the bearing and the bearing cylinder. These means are particularly effective when they consist of at least one bearing element that engages a bearing cylinder element. Advantageously, these elements are brought into collaboration by deformation of one and/or the other element. This arrangement thus makes it possible to keep the operating play of the power transmission means precise without resulting in high assembly cost.

According to an additional characteristic of the invention, a bearing is provided with a grabbing means which enable it to be screwed and unscrewed.

According to a preferred embodiment of the invention, these means consist of at least one recess made in the upper face of a bearing. Thus it is possible to disassemble the bearing with a striking tool such as a hammer without risk of breaking the grabbing means.

According to another embodiment of the invention, the grabbing means consist of a central part which extends from the upper face of the bearing and which has a non-circular, preferably polygonal, outside surface.

According to an additional characteristic of the invention, sealing means prevent leaks of lubricant between a bearing and the associated bearing cylinder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates a method of forming a shoulder to hold the bearing of a disk in the bearing housing;

FIG. 7 shows another embodiment of the bearing that guides a disk in rotation;

FIG. 8 is a view in section of another embodiment of a bearing housing; and

FIG. 9 is a top view of the bearing housing of FIG. 8.

DETAILED DESCRIPTION OF THE PREFERRED EMBODIMENTS

Figure 1:
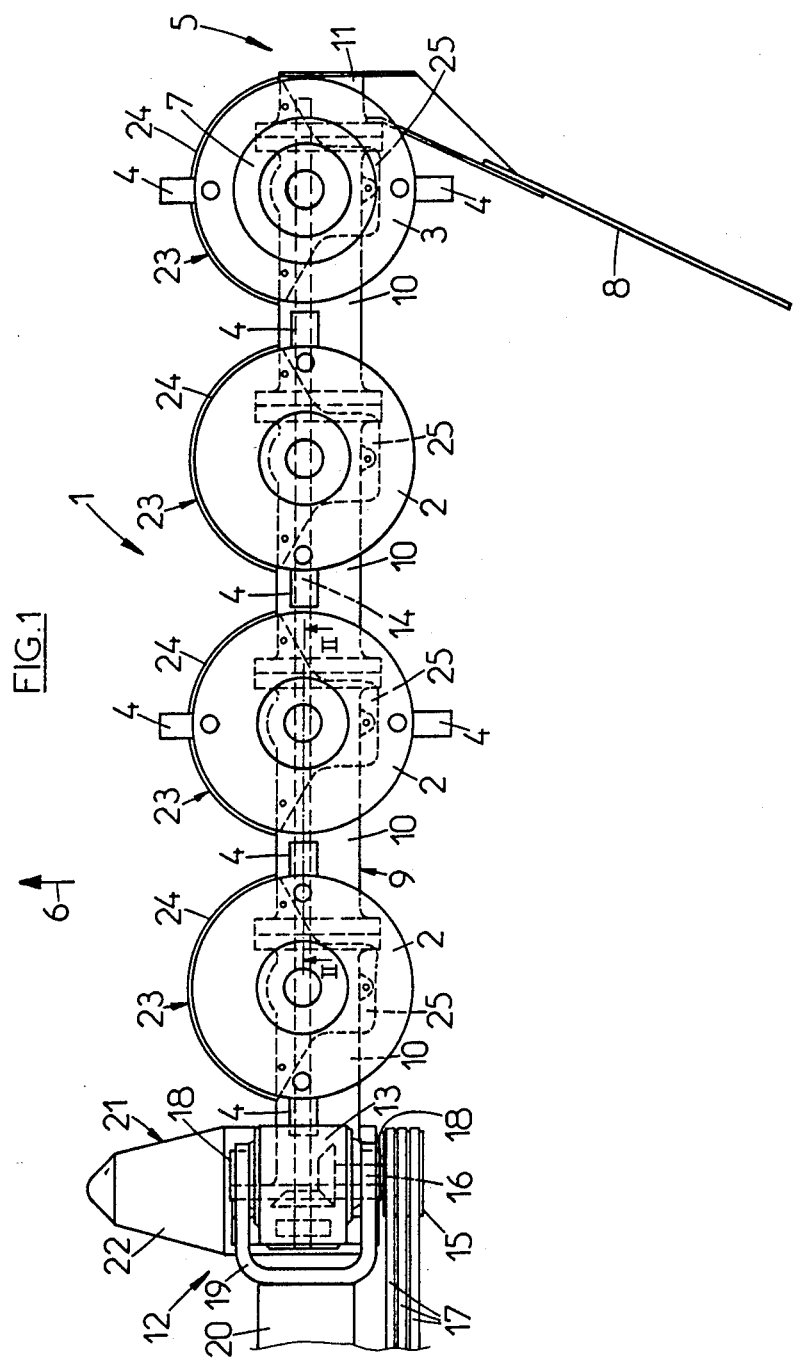
FIG. 1 is a top view of the cutter bar of an embodiment of the mower according to the invention.

FIG. 1 shows a mower, or more precisely, the cutter bar 1 of a mower. The cutter bar 1 comprises in this example three disks 2 and one disk 3 each of which rotates around an upwardly directed axis. Each disk 2, 3 is provided in this example with two cutting tools 4 which are mounted diametrically opposite one another on the outside edges of the associated disk. Preferably, the cutting tools 4 are pivotably mounted on the disks 2, 3 so that the cutting tools 4 pivot outwardly under the effect of centrifugal force and so that the cutting tools 4 can pivot inwardly when they encounter an obstacle during their rotation. The disk 3, which is located at the right end 5 of the cutter bar 1 (seen in the working direction defined by the arrow 6) is surmounted by a drum 7. The drum 7 cooperates with a device for reducing the width of the windrows of cut fodder (such as a windrow plate 8, for example), so that the windrows of cut fodder are separated from the fodder that is still standing.

The disks 2, 3 are guided in rotation by a housing 9 placed under the disks 2, 3. The housing 9, as will be explained in further detail below, is made up of a succession of modules 10. At the right end 5 of the cutter bar 1, the housing 9 is provided with an end module 11 which extends approximately to the outside path described by the disk 3 or slightly beyond that path. At the left end 12, the housing 9 is provided with a transmission gear housing 13.

In the housing 9 are housed transmission means such as W transmission shaft 14 which cooperates with gear wheels (or other appropriate power transmission means) to drive. The disks 2, 3 in rotation. Driving of the transmission means in rotation is achieved by a drive mechanism housed in the transmission gear housing 13' and which will be described in further detail below. The drive mechanism receives the movement of a pulley 15 keyed on an input shaft 16. The pulley 15 is driven in rotation by means of another pulley (not shown) by belts 17. The other pulley (i.e., the pulley that is not shown in the drawings) is driven by the power take off of a tractor (not shown) to which the mower is hitched by a universal joint shaft (also not shown). Since these mechanisms are conventional and well known in this art, they will not be described further here.

The transmission gear housing 13 comprises two cylindrical bearing surfaces 18 at least approximately concentric with the input shaft 16 of the transmission gear housing 13. The cylindrical bearing surfaces 18 support a clevis 19 fastened to a frame 20 by which the mower is hitched to the tractor. With this arrangement, the cutter bar 1 can follow the ups and downs of the ground by pivoting around the axis of the cylindrical bearing surfaces 18 defined by the input shaft 16 without the various drive elements being subjected to additional stresses. Further, it is possible to pivot the cutter bar 1 to an at least approximately vertical position to reduce the width of the mower during transport.

At the left end 12 of the housing 9 and under it (or, more precisely, under the transmission gear housing 13) is placed a shoe 21 which has a front part 22 raised like the front of a ski. The shoe 21 enables the mower to slide over the ground and to avoid hooking of cut fodder onto the transmission gear housing 13.

At the front, under each disk 2, 3, the housing 9 is provided with disk-protecting skids 23. These disk-protecting skids comprise a front part 24 exhibiting, as seen from above, an approximately circular shape the radius of which is greater than the radius of the end path of the disks 2, 3 but smaller than the radius of the end of the cutting tool 4. Further, the disk-protecting protecting skids 23 comprise a rear part 25 in the shape of a skid. The cutter bar 1 rests also on the rear parts 25 of the disk-protecting skids 23.

Figure 2:
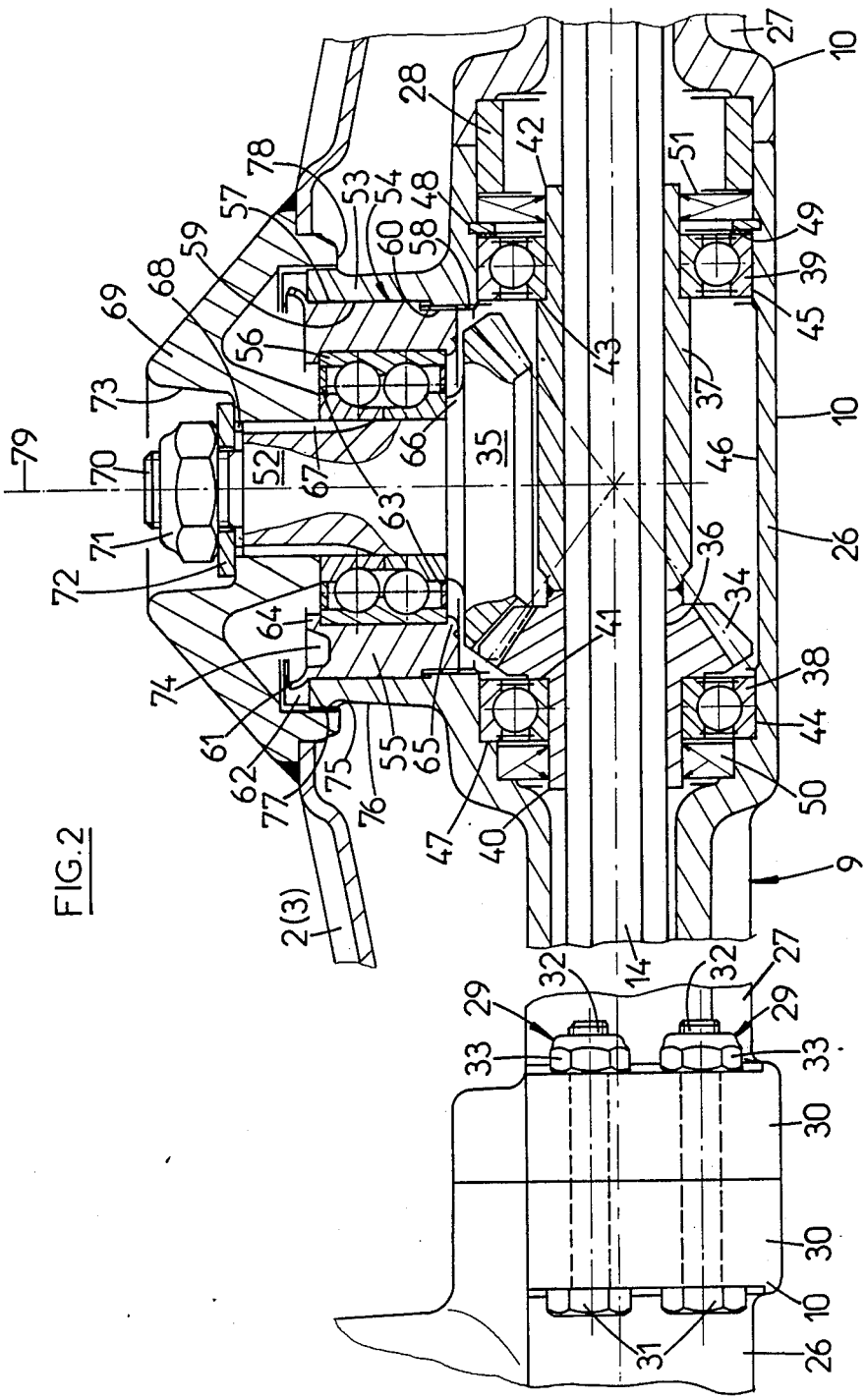
FIG. 2 is a rear view in partial section and on an enlarged scale along plane II—II in FIG. 1.

FIG. 2 shows a section of the cutter bar 1. As said previously, the housing 9 comprises a plurality of modules 10. Each module 10 supports a disk 2, 3. Each module 10 is made up of a case 26, in which a disk 2, 3 is guided in rotation, and a brace 27 which extends between that case 26 and the case 26 of an adjacent module 10. Advantageously, the brace 27 of each module 10 extends to the left of the case 26 of the same module, seen in the direction of advance of the machine during working. The various modules 10 are centered in relation to one another by a centering ring 28 which is received in a mating bore both in the brace 27 of a given module 10 and in the case 26 of an adjacent module 10. Each centering ring 28 has a length such that it can absorb a part of the bending stresses that are exerted on the cutter bar 1 during working and during transport.

The various modules 10 are connected to one another by assembly elements 29. To do this, each module 10 has a flange 30 at each of its ends. The flanges 30 of two adjacent modules 10 are connected together by the assembly elements 29 which consist, in the example of the embodiment illustrated, of bolts 31 the shanks 32 of which go through the two adjacent flanges 30 and of nuts 33 screwed onto the bolts 32. Each of the flanges 30 has a certain width so that the length of the bolts 31 is sufficient to enable the bolts 31 to bear the stresses to which they are subjected.

The housing 9 thus formed contains the transmission shaft 14. In going through each case 26, the transmission shaft 14 cooperates with a pair of gear wheels 34, 35 to impart movement to the corresponding disk 2, 3. To do this, the transmission shaft 14 goes through a bore 36 in each gear wheel 34 which has a shape complementary to that of the transmission shaft 14. In the example illustrated, the transmission shaft 14 has a hexagonal section (see FIG. 4). However, it is possible for the transmission shaft 14 to have a section of another shape as long as its shape allows driving in rotation. Also, it is possible for the transmission shaft 14 to have a shape allowing driving and rotation only in the zones where the gear wheels 34 are mounted.

Each gear wheel 34 is welded to a sleeve 37 which also surrounds the transmission shaft 14. Each gear wheel 34 - sleeve 37 unit is guided in rotation in the associated case 26 by two ball bearings 38, 39. To do this, each gear wheel 34 comprises an external cylindrical bearing surface 40 on which the ball bearing 38 is mounted. The ball bearing 38 abuts axially against a shoulder 41 on the gear wheel 34. The sleeve 37, at its end away from the gear wheel 34, also has an external cylindrical bearing surface 42 on which the ball bearing 39 is mounted. The ball bearing 39 abuts axially against a shoulder 43 on the sleeve 37. The ball bearings 38, 39 are thus mounted on the gear wheel 34 - sleeve 37 unit so that the gearing of the gear wheel 34 is located between the two ball bearings 38, 39.

Advantageously, the outside diameter of the ball bearings 38, 39 is the same, which offers advantages in making the outside bearing surfaces 44, 45, which are machined in the case 26. Also, the length of the outside bearing surfaces 44, 45 is reduced to the bear minimum to reduce machining time and to facilitate assembly. For this, the center part 46 of each case 26, located between the outside bearing surfaces 44, 45, has a larger inner diameter than the diameter of the bearing surfaces 44, 45. Holding of the gear wheel 34 - sleeve 37 unit in the case 26 against axial translation is performed, on the one hand, by a shoulder 47 made in the case 26 and, on the other hand, by a stop element such as a circlip 48. Between the ball bearing 39 and the circlip 48 are placed a variable number of distance washers 49, which make it possible to reduce or eliminate axial play resulting from different dimensional tolerances.

Since the case 26 contains a lubricant, sealing elements such as sealing rings 50, 51, which act between each case 26 and the associated gear wheel 34; sleeve 37 unit, are placed on the external cylindrical bearing surfaces 40, 42 of the gear wheel 34 and the sleeve 37, respectively. The two sealing rings 50, 51 are placed so that the two ball bearings 38, 39 and the gearing of gear wheel 34 are located between the two sealing rings 50, 51. With this arrangement, each case 26 remains sealed independently of the presence of the transmission shaft 14.

Each gear wheel 34 engages a corresponding gear wheel 35 which is mounted on a disk shaft 52. Each disk shaft 52 is guided in rotation in a bearing cylinder 53 by a bearing 54 which, in the illustrated embodiment, is made up of a bearing housing 55 having a bore 118 and a face 119 (see FIG. 6) and a ball and a bearing 56. As can be seen in FIG. 2, each bearing cylinder 53 is an integral part of the corresponding case 26 and, therefore, of the module 10. The inside bore of each bearing cylinder 53 comprises a smooth part 57 and a threaded part 58. Likewise, the outside surface of each bearing 54 also comprises a smooth part 59 and a threaded part 60. The threading of the threaded parts 58, 60 is advantageously a fine-pitch threading.

Thanks to the smooth parts 57 and 59, each bearing 54 is centered in the corresponding bearing cylinder 53, and, thanks to the threaded parts 58 and 60, each bearing 54 is held against translation in the corresponding bearing cylinder 53.

So that the bearings 54 cannot turn once they have been screwed into the corresponding bearing cylinders 53, each bearing 54 is provided on its upper part with a thin cylindrical crown 61 which is partially deformed to cooperate with two notches 62 arranged in the upper part of the corresponding bearing cylinder 53. Each bearing housing 55 supports the associated ball bearing 56, and the associated ball bearing 56 is centered in the bore of the ball bearing housing 55. The ball bearing 56, in the example illustrated, is an angular-contact double-row ball bearing. The ball bearing 56 is provided with integrated sealing means 63. The ball bearing 56 is held against axial translation in the associated ball bearing housing 55 by two shoulders 64, 65. The shoulder 64 is made by machining, while the shoulder 65 is made, after assembly of the ball bearing 56, in a way that will be explained below in connection with FIG. 6.

Each disk shaft 52-gear wheel 35 unit is centered in the bore of the corresponding ball bearing 56. The inside ring of the ball bearing 56 abuts axially against a shoulder 66 on the gear wheel 35. Near its free end, each disk shaft 52 is provided with splines 67 which mesh with splines 68 formed in a driver 69 which is welded to the associated disk 2, 3. To fasten the associated disk 2, 3 on the disk shaft 52, the disk shaft 52 ends in a threaded part 70 which extends beyond the driver 69. A nut 71 is screwed onto the threaded part 70 of the disk shaft 52 after insertion of a washer 72. By screwing the nut 71 on the threaded part 70, the associated ball bearing 56 is locked against . movement between the shoulder 66 and the driver 69. To protect the nut 71 from wear, it is housed in a recess 73 formed in the upper part of the driver 69.

Assembly of a module 10 is performed as follows.

First a gear wheel 34 - sleeve 37 unit is preassembled -- i.e., a ball bearing 38 and a sealing ring 50 are assembled on an external cylindrical ball bearing surface 40 and a ball bearing 39 is assembled on an external cylindrical ball bearing surface 42. The unit thus preassembled is then slipped into the case 2.6 until the ball bearing 38 strikes against the shoulder 47. Then the necessary number of distance washers 49 are put in place, and the gear wheel 34 - sleeve 37 unit is axially locked with the circlip 48.

The case 26 is then sealed by assembling sealing ring 51.

Then a gear wheel 35 - disk shaft 52 - bearing 54 unit is preassembled. To do this, the bearing 54 is assembled on a disk shaft 52 until it strikes against the shoulder 66.

Then the gear wheel 35 - disk shaft 52 bearing 54 unit is assembled in the bearing cylinder 53. This is possible because the smallest diameter of the bore of the bearing cylinder 53 is greater than the outside diameter of the gear wheel 35. Advantageously, during assembly, the bearing 54 is first centered in the bearing cylinder 53 by sliding engagement of the smooth parts 57 and 59 before the threaded part 58 and 60 are screwed into one another. Thus, it is assured that the two threaded parts 58 and 60 are aligned axially, which makes it possible to avoid groping when starting screwing. In addition, the threaded parts 58 and 60 are placed in the case 26 and on the bearing 54 in relation to the gear wheels 34 and 35 so that the threaded parts 58 and 60 cannot be brought into engagement when a tooth of the gear wheel 35 strikes against a tooth of . the gear wheel 34. Thus, screwing can only be performed when one of the gear wheels 34 and 35 has been slightly turned in relation to the other As the bearing 54 is then screwed into the bearing cylinder 53, the gear wheel 35 is brought toward the gear wheel 34. When the gear wheel 35 occupies a good position in relation to the gear wheel 34 (i.e., the correct operating play between the two gear wheels 34 and 35 has been attained) screwing of the bearing 54 in the bearing cylinder 53 is stopped. To maintain this position, a part of the thin cylindrical crown 61 is deformed to make it penetrate into at least one of the notches 62. It will be noted that, to facilitate screwing or unscrewing later during intervention, the bearing 54 is provided with a grabbing means such as a recess 74.

Since the bearing 54 is not centered in the bearing cylinder 53 by clamping, and depending on the nature of the lubricant contained in the case 26, it may prove necessary to prevent the lubricant from leaking between the bearing 54 and the bearing cylinder 53. To do this, it is possible to place sealing means between these two parts. The sealing means can be, for example, an adhesive placed between the bearing 54 and the bearing cylinder 53.

In the assembly shown in FIG. 2, the gear wheel. 34 extends to the left of the disk shaft 52. This position therefore defines the direction of rotation of the corresponding disk for a given direction of rotation of the transmission shaft 14. For a disk to rotate in the opposite direction for a given direction of rotation of the transmission shaft 14, assembly would have to be performed so that the corresponding gear wheel 34 extends to the right of the disk shaft 52. In this case, assembly of the gear wheel 34 sleeve 37 unit in the corresponding case 26 is performed as follows. The sealing ring 50 is assembled on the external cylindrical bearing surface 42, and that unit is slipped into the case 26 with the sleeve 37 leading until the bearing 39 strikes against the shoulder 47. Then the necessary number of distance washers 49 are assembled and axially locked with the circlip 48. Finally, the sealing ring 51 is assembled. In this case, assembly of the gear wheel 35 - disk shaft 52 - bearing 54 unit and adjustment of the operating play between the gear wheels 34 and 35 are identical with the assembly and adjustment operations described above.

To limit winding and introduction of blades of fodder or string-like bodies around the bearing cylinder 53 or in the bearing cylinder 53, the outside surface of the bearing cylinder 53 comprises an upper zone 75 and a lower zone 76. The upper zone 75 is located in the upper part of the outside surface of the bearing cylinder 53 and extends to the inside of a bore 77 in the driver 69. The diameter of the bore 77 is slightly greater than the diameter of the upper zone 75 to form a baffle. The upper zone 76 extends from the upper zone 75 downwardly, and the upper zone 76 has a diameter smaller than the diameter of the upper zone 75. Further, the length of the lower zone 76 is relatively great.

Advantageously, the lower surface 78 of the driver 69 extends approximately to the vicinity of the boundary between the upper zone 75 and at the lower zone 76 and preferably slightly higher than that boundary. Also advantageously, the lower surface 78 of the driver 69 can extend from the vicinity of the boundary between the upper zone 75 and the lower zone 76 outwardly and upwardly.

Figure 5:
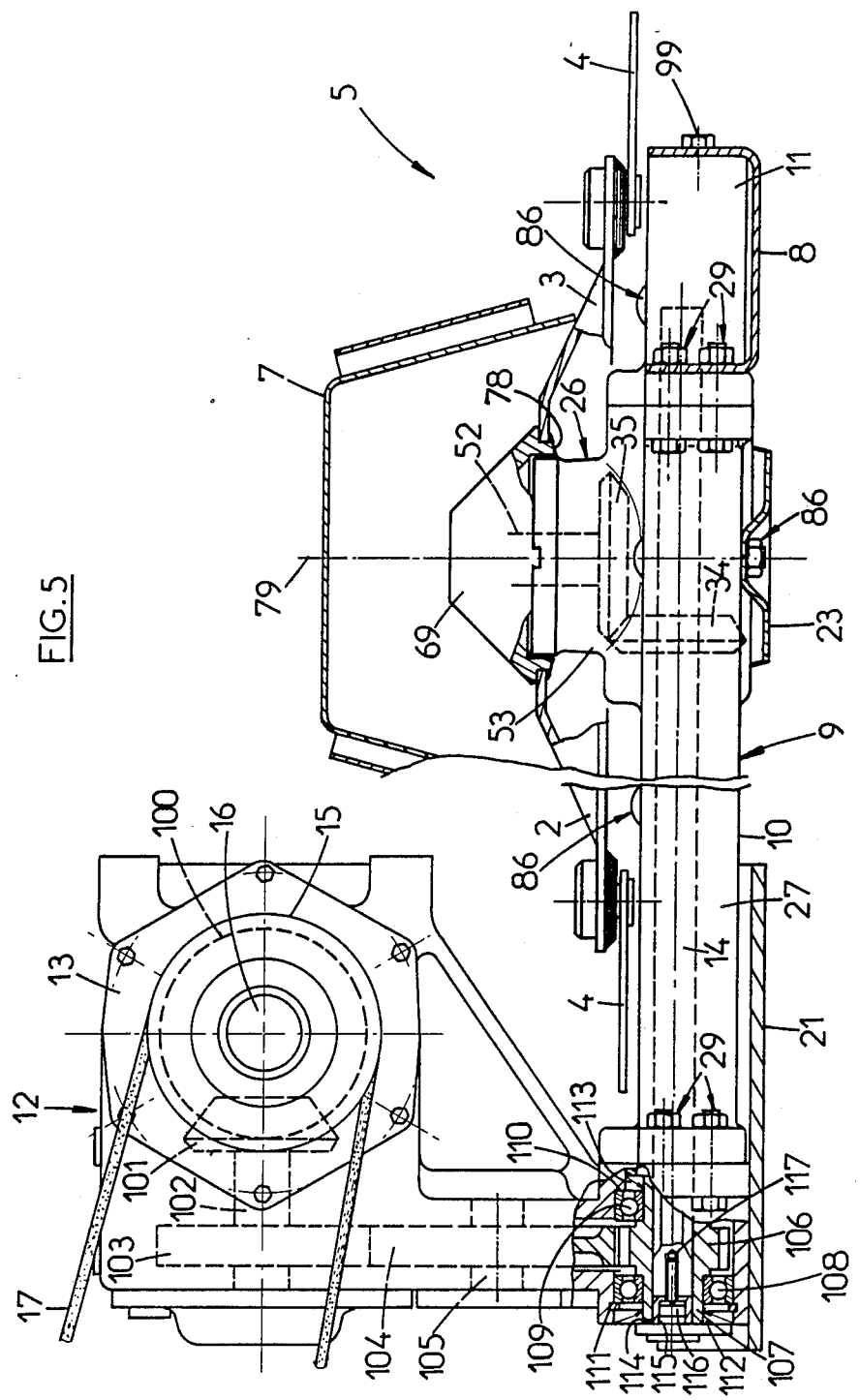
FIG. 5 is a rear view partially in section of the ends of the cutter bar.

An example of an embodiment of such an arrangement is shown in FIG. 5, where the lower surface 78 of the driver 69 is substantially conical. With this arrangement, the risk of winding of blades of fodder or string-like bodies is substantially reduced because the space between the stationary locations where blades of fodder or string-like bodies could hook and the rotating disk is relatively great. Moreover, if such a winding should occur, it could not penetrate the baffle formed between the bearing cylinder 53 and the driver 69. In fact, when winding occurs at the boundary of the upper zone 75 and the lower zone 76, and considering the rapidity with which the winding progresses because the speed of rotation of the disks 2, 3 is high, the winding has a tendency to be propagated outwardly and to close the angle formed between the bearing cylinder 53 and the driver 69. This tendency to be propagated outwardly is generated by the difference in diameter between the upper zone 75 and the lower zone 76.

Figure 3:
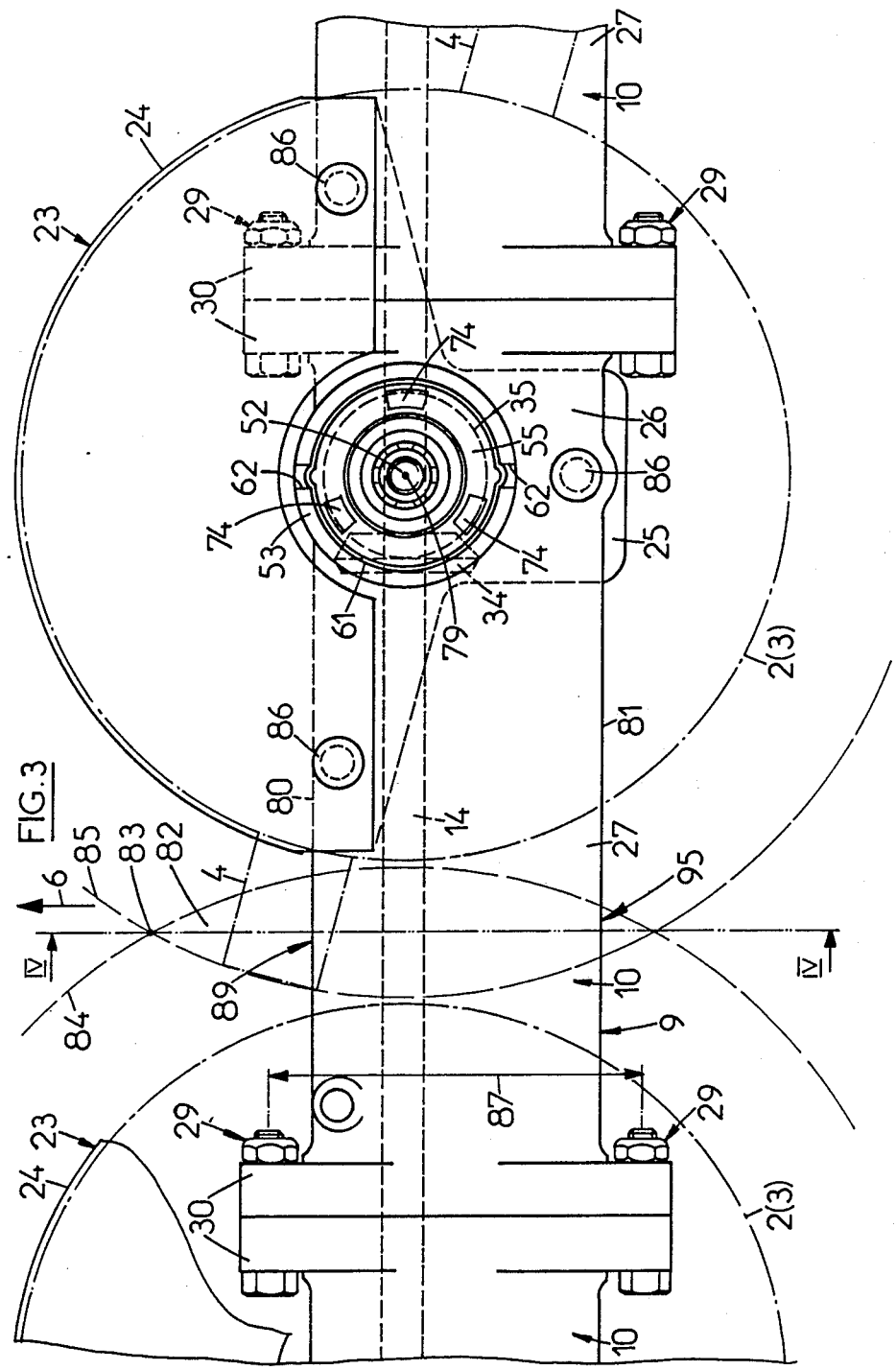
FIG. 3 is a top view on an enlarged scale of the cutter bar without disks.

FIG. 3 shows a top view of the cutter bar 1. For greater clarity, disks 2, 3 have been drawn in broken lines. It can be seen in this figure that the axis 79 of the bearing cylinder 53, which also corresponds to the axis of rotation of the corresponding disks 2, 3, is located closer to the front edge 80 of the housing 9 than to the rear edge 81 of the housing 9. For this reason, an over-cut triangle 82, which is defined by the front intersection point 83 of the end paths 84, 85 described by the cutting tools 4 of two adjacent disks, the end paths 84, 85, and the front edge 80 of the housing 9, is very great. This makes it possible to guarantee a very good cut of fodder between two adjacent disks.

The disk-protecting/skid 23 extends at the level of each bearing cylinder 53. As said above, the disk-protecting skid 23 comprises a front part 24 having an approximately circular shape centered approximately on. the axis 79. The disk-protecting/skid 23 is fastened to. the housing 9 by a number of fastening elements 86 -three in the example illustrated. The fastening elements 86 are located close to the front edge 80 and the rear edge 81 of the housing 9.

Likewise, the assembly elements 29, which connect the various modules 10 together, also extend to the front and back of the flanges 30. Advantageously, the distance 87 between the assembly elements 29 is relatively great, so that the connection between the modules 10 is very strong.

FIG. 3 also shows the way that the thin cylindrical crown 61 of each bearing 54 is deformed to penetrate into the notches 62 in the bearing cylinder 53 to block the rotation of the bearing 54. It will be noted that, for intervention at the level of the case 26, it is only necessary to disengage the thin cylindrical crown 61 from the notches 62 of the bearing cylinder 53 in order to be able to unscrew the bearing 54 from the bearing cylinder 53.

Figure 4:
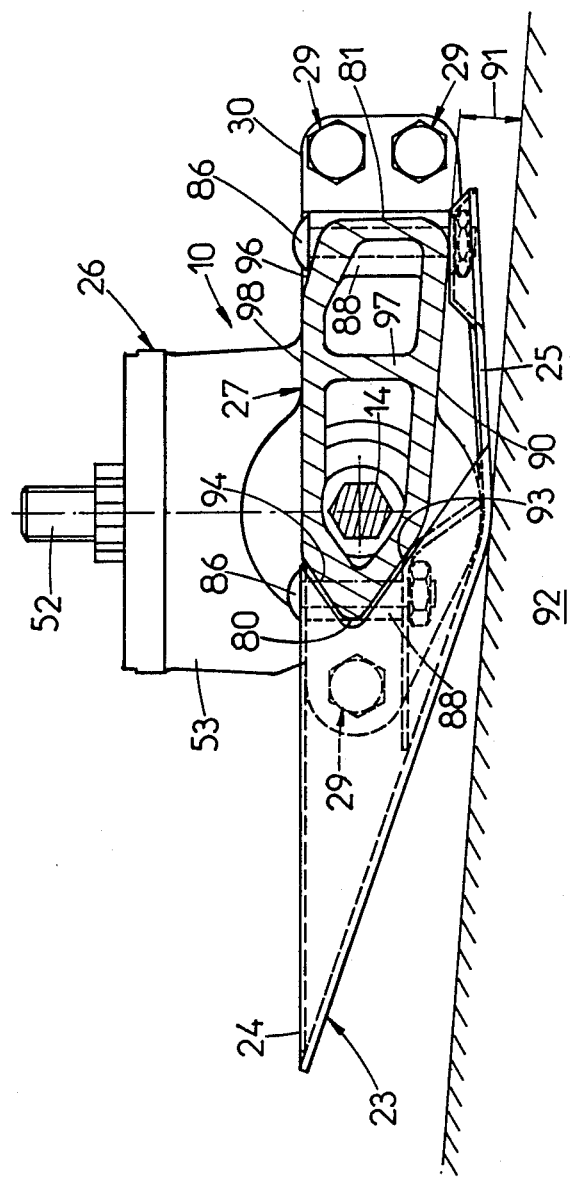
FIG. 4 is a side view in section along plane IV—IV in FIG. 3.

FIG. 4 is a cross section of the cutter bar 1 on the line IV—IV in FIG. 3. In FIG. 4 it can be seen that the disk-protecting/skids 23 fit partially on the front edge 80 of the associated housing 9. The fastening elements 86, which fasten the disk-protecting/skids 23 on the housing 9, go through pierced bosses 88 arranged in the housing 9.

The front edge 80 of the brace 27 has a relatively pointed shape. Thanks to this shape, the risk of dirt or plant debris sticking to the front edge 80, which would reduce the quality of the cut, is reduced. It should be noted that the braces 27 (which are components of the housing 9) have this pointed shape at least in the zone 89 (shown in FIG. 3) which extends between two adjacent disks 2, 3 where the cutting tools pass above the housing 9 during their rearward rotation.

Moreover, the lower face 90 of each brace 27 extends a certain distance 91 from the ground surface 92. Thus, the dirt and/or plant debris possibly scraped by the front of the housing 9 can escape under the housing 9. It should be noted that the space between the lower face 90 of each brace 27 and the ground surface 92 preferably extends over the entire length of the brace 27.

For good channeling of the dirt and/or plant debris to the space between the lower face 90 of each brace 27 and the ground surface 92, the front edge 80 of the brace 27 portion of the housing 9 advantageously has an inclined surface 93 directed backwardly and downwardly. The inclined surface 93 extends at least in the zone 89 of the front edge 80.

The front edge 80 also has an inclined surface 94 directed upwardly and backwardly. With this shape, the impact between a cutting tool 4 which has been accidentally bent downwardly and the front edge 80 is attenuated. Further, considering the speed of rotation of the cutting tools 4, the inclined surface 94 can somewhat straighten a bent cutting tool 4.

So that the housing 9 will be capable of bearing up well under the impact caused by a bent cutting tool 4 and to reduce the risk of nicking the housing 9 during such an impact, at least the upper part of the front edge 80 of the brace 27 portion of the housing 9 has a greater thickness than the rest of the brace 27. It should be noted that the inclined surface 94 and the location where the thickness of the brace 27 is greater extend at least in the zone 89 (see FIG. 3). When a downwardly bent cutting tool 4 is not completely straightened by contact with the brace 27, it then also strikes the rear edge 81 of the housing 9 in a zone 95 on the adjacent module 10 (see FIG. 3) above which it passes during its forward motion. To attenuate the impact in this case, the rear edge 81 of the brace 27 portion of the housing 9 has, at least in the zone 95, an inclined surface 96 directed forwardly and upwardly. Likewise, as for the front edge 80, the thickness of the material in the zone 95 is also greater than in the rest of the cross section of the brace 27.

To stiffen the section of the brace 27, it is possible to provide at least one rib 97 that connects the lower face 90 to the upper face 98 of each brace 27. The rib 97 can even extend into the case 26 so as to connect the two flanges 30 of a module 10.

FIG. 5 shows the right end 5 and to be left end 12 of the cutter bar 1 in a rear view.

At the right end 5, the cutter bar 1 comprises, as said above, an end module 11 which closes the right end 5 of the cutter bar 1. The end module 11 extends to the end path of the disk 3 or slightly beyond it. Thus, to a certain extent, the end module 11 can laterally protect the disk 3. The windrow plate 8 is fastened to the end module 11 by the assembly elements 29 which fasten the end module 11 to the module 10 which supports the disk 3 and by connecting elements 99.

Turning to the left end 12 of the housing 9, it will be seen that the transmission gear housing 13 extends to the left end 12. As said above, the transmission gear housing 13 contains a drive mechanism that transmits the movement of the pulley 15 to the transmission shaft 14. The drive mechanic: is made up of the following elements.

A gear wheel 100 is keyed on the input shaft 16, on which the pulley 15 is also keyed. The gear wheel 100 engages a gear wheel 101 which is engaged on a shaft 102 which extends at least approximately perpendicularly to the input shaft 16 and is at least approximately parallel to the transmission shaft 14. On the shaft 102 is also keyed a cylindrical gear wheel 103 which engages another cylindrical gear wheel 104 keyed on a shaft 105. The shaft 105 extends at least approximately parallel to the shaft 102.

The cylindrical gear wheel 104 engages a third cylindrical gear wheel 106 keyed on the transmission shaft 14. The shafts 102 and 105 are guided in rotation in the transmission gear housing 13 by bearings (not shown). The cylindrical gear wheel 106 comprises a cylindrical part 107 that extends concentrically on both sides of its gearing and which acts as a bearing surface for ball bearings 108, 109 guiding the cylindrical gear wheel 106 in rotation. A shoulder 110 formed in the transmission gear housing 13 and a circlip 111 prevent axial translation of the ball bearings 108, 109. The transmission gear housing 13 also comprises sealing elements 112, 113 at its base which extend between the walls of the transmission gear housing 13 and the cylindrical part 107 of the cylindrical gear wheel 106 to seal the transmission gear housing 13 independently of the presence of the transmission shaft 14.

The cylindrical part 107 contains a bore 114 having a shape complementary to that of the transmission shaft 14. The bore 114 cooperates with the transmission shaft 14, which extends partially into the bore 114. To hold the transmission shaft 14 axially, a stop element 115 is mounted in the cylindrical gear wheel 106. A screw 116, the head of which abuts the stop element 115 and the shank of which goes through the stop element 115, is screwed into a threaded hole 117 in the end of the transmission shaft 14.

To disassemble the transmission shaft 14, the screw 116 is removed to release the transmission shaft 14 axially, then the end module 11 is removed and the transmission shaft 14 is pulled out through the right end 5 of the cutter bar 1. To permit grasping of the transmission shaft 14, the transmission shaft 14 extends beyond the farthest right of the modules 10, and the transmission shaft 14 can even comprise grabbing means at this location.

FIG. 6 illustrates a way of forming the shoulder 65. Before assembly, the bore 118 in the bearing housing 55 comes out on the face 119 of the bearing housing 55 as shown in broken lines. After assembly of the ball bearing 56 in the bore 118, a tool 120 is driven into the face 119, which has the effect of deforming the location of the bore 118 at the face 119. The deformation causes a displacement of the material toward the axis 79 of the bearing housing 55, and the deformation then holds the ball bearing 56 in the bearing housing 55.

FIG. 7 shows another embodiment of the bearing 54. In this example, the ball bearing 56 has an outer ring which has a sufficient size to be centered in the bearing cylinder 53. The outer ring of the ball bearing 56 comprises a shoulder 121. Likewise, the bore of the bearing cylinder 53 comprises a shoulder 122. An O-ring 123 is placed between the shoulders 121 and 122. The bearing 56 is held axially in the ball bearing cylinder 53 by the shoulders 121 and 122 and by a circlip 124 which is inserted in the bearing cylinder 53 after insertion of a washer 125 and distance washers 126.

Assembly of the bearing 54 in the bearing cylinder 53 and adjustment of the operating play in the gear wheels 34 and 35 is performed as follows. The bearing 54 is assembled in the bearing cylinder 53, and pressure is put on the bearing 54 or the washer 125 to crush the O-ring 123 (the operation of deformation of the O-ring 123 is shown by an arrow 127). When the correct operating play of the gear wheels 34 and 35 is obtained, the pressure is maintained, the necessary number of distance washers 126 are installed, and the circlip 124 is put in place. After the pressure is relaxed, the bearing 54 maintains its position in the bearing cylinder 53. It should be noted that the O-ring 123 also prevents leaking of the lubricant contained in the case 26 between the bearing 54 and the bearing cylinder 53. Similarly, an O-ring 128 prevents leaking of lubricant between the bearing 54 and the disk shaft 52.

FIGS. 8 and 9 show a variant embodiment of grabbing means which allows screwing and unscrewing of the bearing 54. These means consist of a central part 129 which extends from the upper face of the bearing 54 and which has an outside surface that is non-circular and is preferably polygonal. In the example shown, this outside surface is hexagonal. Thus it is possible to use a standard wrench to screw and unscrew the bearing 54.

Various modifications or improvements of the examples described are possible without thereby going outside the scope of the invention.

In particular, the transmission shaft 14 could be made in several parts. Moreover, the zones of the transmission shaft 14 where it cooperates with the gear wheels 106 and 34 can have a nominal dimension greater than the rest of the transmission shaft 14. Further, the bearing 54 can also be a smooth bearing.

Obviously, numerous additional modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A mower comprising:
   (a) a frame by means of which said mower is, during use, hitched to a pulling vehicle;
   (b) a cutting bar connected to said frame, said cutting bar comprising:
      (i) a plurality of rotary cutting elements and
      (ii) a housing located under said plurality of rotary cutting elements, said housing being at least partially formed by cases and brace elements determining the distance between each two adjacent cases, said cases and said brace elements extending at least approximately in line one after the other in the longitudinal direction of said housing, at least some of said plurality of rotary cutting elements being individually guided in rotation in an associated one of said cases around an upwardly directed axis, each one of said brace elements being formed integrally with at least a part of the corresponding one of said cases so as to form a module, at leach end of each one of said modules there being a flange which abuts an associated flange on an adjacent one of said modules, and assembly elements, one part of which extends at the front of said housing and another part of which extends at the rear of said housing, said assembly elements comprising bolts which extend at least approximately parallel to said longitudinal direction of said housing and which form the only connections between said modules, the corresponding bolts of two adjacent modules rigidly but releasably connecting the abutting flanges of said two adjacent modules to one another and extending, as seen from above, at least approximately beneath at least an associated one of said plurality of rotary cutting elements; and
   (c) transmission means adapted, during use, to transfer rotational power from a source of rotational power to said plurality of rotary cutting elements for driving in rotation each one of said plurality of rotary cutting elements around the corresponding one of said upwardly directed axes.

2. The mower according to claim 1 wherein said brace element of each one of said modules is located on the same side of the corresponding one of said cases.

3. The mower according to claim 2 wherein said brace element of each one of said modules is located, as seen from the rear of the mower in the working direction, on the left side of the corresponding one of said cases.

4. The mower according to claim 1 wherein:
   (a) each one of said cases of said modules comprises a bearing cylinder the axis of which corresponds to the axis of rotation of the corresponding one of said plurality of rotary cutting elements and
   (b) said bearing cylinder is an integral part of said module.

5. The mower according to claim 1 wherein each one of said cases of said modules comprises a bearing cylinder the axis of which corresponds to the axis of rotation of the corresponding one of said plurality of rotary cutting elements, said bearing cylinder having an outside surface which comprises:
   (a) a first zone of a certain diameter at least a part of which extends within a portion of the associated one of said plurality of rotary cutting elements to form a baffle and
   (b) a second zone which is adjacent to and extends lower than the first zone and which has a diameter smaller than the diameter of said first zone.

6. The mower according to claim 5 wherein each one of said second zones is axially longer than the corresponding one of said first zones.

7. The mower according to claim 5 wherein:
   (a) 0 said portion of each one of said plurality of rotary cutting elements comprises a lower surface and
   (b) said lower surface extends at least slightly higher than the boundary between said first and second zones of the associated one of said bearing cylinders.

8. The mower according to claim 7 wherein said lower surface extends from the vicinity of the boundary between said first and second zones of the associated one of said bearing cylinders outwardly and upwardly.

9. The mower according to claim 1 wherein the axis of rotation of the one of said plurality of rotary cutting elements guided in rotation in each of said cases is located near a front edge of the corresponding one of said modules.

10. The mower according to claim 1 wherein each two adjacent modules are centered in relation to one another.

11. The mower according to claim 10 wherein said each two adjacent modules are centered in relation to one another by means of a centering ring.

12. The mower according to claim 1 wherein said brace elements are sized, shaped, and positioned so that, during working, at least a part of the lower face of each of said brace elements is located in a distance from the ground.

13. The mower according to claim 1 wherein:
   (a) each one of said brace elements has a front edge and
   (b) said front edge is pointed at least in the zone above which cutting tools of the associated ones of said plurality of rotary cutting elements pass during rotation.

14. The mower according to claim 13 wherein said front edge of each one of said brace elements has, at least in the zone above which said associated cutting tools pass during rotation, an inclined surface directed backwardly and downwardly.

15. The mower according to claim 13 wherein said front edge of each one of said brace elements has, at least in the zone above which said associated cutting tools pass during rotation, an inclined surface directed backwardly and upwardly.

16. The mower according to claim 13 wherein said front edge of each one of said brace elements has, at least in its upper part and at least in the zone above which said associated cutting tools pass during rotation, a greater thickness of material.

17. The mower according to claim 1 wherein:
   (a) each one of said brace elements has a back edge and
   (b) said back edge has, at least in the zone above which cutting tools of the associated ones of said plurality of rotary cutting elements pass during rotation, an inclined surface directed forwardly and upwardly.

18. The mower according to claim 1 wherein:
   (a) each one of said brace elements has a back edge and
   (b) said back edge has, at least at its upper part and at least in the zone above which cutting tools of the associated ones of said plurality of rotary cutting elements pass during rotation, a greater thickness of material.

19. A mower comprising:
   (a) a frame by means of which said mower is, during use, hitched to a pulling vehicle;
   (b) a cutting bar connected to said frame, said cutting bar comprising:
      (i) two rotary cutting elements and
      (ii) a housing located under said two rotary cutting elements, said housing comprising two cases and a brace element determining the distance between said two cases, said two cases and said brace element extending at least approximately in line one after the other in the longitudinal direction of said housing, each of said two rotary cutting elements being guided in rotation in an associated one of said two cases around an upwardly directed axis, said brace element being formed integrally with at least a part of one of said two cases so as to form a module which comprises a flange abutting a flange on the other of said two cases, and assembly elements, one part of which extends at the front of said housing and another part of which extends at the rear of said housing, said assembly elements comprising bolts which extend at least approximately appellate to said longitudinal direction of said housing and which form the only connections between said modules, said bolts rigidly but releasably connecting said abutting flanges of said modules and said other said two cases to one another and extending, as seen from above, at least approximately beneath at least one of said two rotary cutting elements; and
   (c) transmission means adapted, during use, to transfer rotational power from a source of rotational power to said two rotary cutting elements for driving in rotation each one of said two rotary cutting elements around the corresponding one of said upwardly directed axes.

20. In a cutting bar comprising a plurality of rotary cutting elements and a housing located under said plurality of rotary cutting elements, said housing being at least partially formed by cases and brace elements determining the distance between each two adjacent cases, said cases and said brace elements extending at least approximately in line one after the other in the longitudinal direction of said housing, sat least some of said plurality of rotary cutting elements being individually guided in rotation in an associated one of said cases around an upwardly directed axis, said cutting bar also comprising transmission means for transferring rotational power to said plurality of rotary cutting elements from a source of rotational power, an improved housing comprising modules each formed by one of said brace elements formed integrally with at least a part of the corresponding one of said cases, at each end of each one of said modules there being a flange which abuts an associated flange on an adjacent one of said modules, and assembly elements, one part of which extends at the front of said housing and another part of which extends at the rear of said housing, said assembly elements comprising bolts which extend at least approximately parallel to said longitudinal direction of said housing and which form the only connections between said modules, the corresponding bolts of two adjacent modules rigidly but releasably connecting the abutting flanges of said two adjacent modules to one another and extending, as seen from above, at least approximately beneath at least an associated one of said plurality of rotary cutting elements.

21. The cutting bar according to claim 20 wherein said brace element of each one of said modules is located on the same side of the corresponding one said cases.

22. The cutting bar according to claim 21 wherein said brace element of each one of said modules is located, as seen from the rear of said housing to the front of said housing, on the left side of the corresponding one of said cases.

23. The cutting bare according to claim 20 wherein:

(a) each one of said cases of said modules comprises a bearing cylinder the axis of which corresponds to the axis of rotation of the corresponding one of said plurality of rotary cutting elements and (b) said bearing cylinder is an integral part of said module.

24. The cutting bar according to claim 20 wherein each one of said cases of said modules comprises a bearing cylinder the axis of which corresponds to the axis of rotation of the corresponding one of said plurality of rotary cutting elements, said bearing cylinder having an outside surface which comprises:

(a) a first zone of a certain diameter at least a part of which extends within a portion of the associated one of said plurality of rotary cutting elements to form a baffle and (b) a second zone which is adjacent to and extends lower than the first zone and which has a diameter smaller than the diameter of said first zone.

25. The cutting bar according to claim 24 wherein each one of said second zones is axially longer than the corresponding one of said first zones.

26. The cutting bar according to claim 24 wherein:

(a) said portion of each one of said plurality of rotary cutting elements comprises a lower surface and (b) said lower surface extends at least slightly higher than the boundary between said first and second zones of the associated one of said bearing cylinders.

27. The cutting bar according to claim 26 wherein said lower surface extends from the vicinity of the boundary between said first and second zones of the associated one of aid bearing cylinders outwardly and upwardly.

28. The cutting bar according to claim 20 wherein the axis of rotation of the one of said plurality of rotary cutting elements guided in rotation in each of said cases is located near a front edge of the corresponding one of said modules.

29. The cutting bar according to claim 20 wherein each two adjacent modules are centered in relation to one another.

30. The cutting bar according to claim 29 wherein said each two adjacent modules are centered in relation to one another by means of a centering ring.

31. The cutting bar according to claim 20 wherein said brace elements are sized, shaped, and positioned so that, during working, at least a part of the lower face of each of said brace elements is located a distance from the ground.

32. The cutting bar according to claim 20 wherein:

(a) each one of said brace elements has a front edge and (b) said front edge is pointed at least in the zone above which cutting tools of the associated ones of said plurality of rotary cutting elements pass during rotation.

33. The cutting bar according to claim 32 wherein said front edge of each one of said brace elements has, at least in the zone above which said associated cutting tools pass during rotation, an inclined surface directed backwardly and downwardly.

34. The cutting bar according to claim 32 wherein said front edge of each one of said brace elements has, at least in the zone above which said associated cutting tools pass during rotation, an inclined surface directed backwardly and upwardly.

35. The cutting bar according to claim 32 wherein said front edge of each of said brace elements has, at least in its upper part and at least in the zone above which said associated cutting tools pass during rotation, a greater thickness of material.

36. The cutting bar according to claim 20 wherein:

(a) each one of said brace elements has a back edge and (b) said back edge has, at least in the zone above which cutting tools of the associated one of said plurality of rotary cutting elements pass during rotation, an inclined surface directed forwardly and upwardly.

37. The cutting bar according to claim 20 wherein:

(a) each of said brace elements has a back edge and (b) said back edge has, at least at its upper part and at least in the zone above which cutting tools of the associated ones of said plurality or rotary cutting elements pass during rotation, a greater thickness of material. transmission means for transferring rotational power to said plurality of rotary cutting elements from a source of rotational power, an improved housing comprising modules each formed by one of said brace elements formed integrally with at least a part of the corresponding one of said cases, at leach end of each one of said modules there being a flange which abuts an associated flange on an adjacent one of said modules, and assembly elements, one part of which extends at the front of said housing and another part of which extends at the rear of said housing, said assembly elements comprising bolts which extend at least approximately parallel to said longitudinal direction of said housing and which form the only connections between said modules, the corresponding bolts of two adjacent modules rigidly but releasably connecting the abutting flanges of said two adjacent modules to one another and extending, as seen from above, at least approximately beneath at least an associated one of said plurality of rotary cutting elements.

38. In a cutting bar able to be equipped with a plurality of rotary cutting elements and comprising a housing located under said plurality of rotary cutting elements, said housing being at least partially formed by cases and brace elements determining he distance between each two adjacent cases, said cases and said brace elements extending at least approximately in line one after the other in the longitudinal direction of said housing, at least some of said plurality of rotary cutting elements being individually guided in rotation in an associated one of said cases around an upwardly directed axis, said cutting bar also comprising transmission means for transferring rotational power to said plurality of rotary cutting elements from a source of rotational power, an improved housing comprising modules each formed by one of said brace elements formed integrally with at least a part of the corresponding one of said cases, at each end of each one of said modules there being a flange which abuts an associated flange on an adjacent one of said modules, and assembly elements, one part of which extends at the front of said housing and another part of which extends at the rear of said housing, said assembly elements comprising bolts which extend at least approximately parallel to said longitudinal direction of said housing and which form the only connections between said modules, the corresponding bolts o two adjacent modules rigidly but releasably connecting the butting flanges of said two adjacent modules to one another and extending, as seen from above, at least approximately beneath at least an associated one of said plurality of rotary cutting elements.

* * * * *

UNITED STATES PATENT AND TRADEMARK OFFICE
CERTIFICATE OF CORRECTION

PATENT NO.  : 4,947,629
DATED       : AUGUST 14, 1990
INVENTOR(S) : RINO ERMACORA

It is certified that error appears in the above-identified patent and that said Letters Patent is hereby corrected as shown below:

In column 14, line 60, delete "0";

In column 16, lines 12 and 13, delete "appellate" and insert --parallel--;

In column 16, line 34, delete "sat" and insert --at--;

In column 18, lines 17-37, delete "transmission... elements.";

In column 18, line 42, delete "he" and insert --the--.

Signed and Sealed this

Tenth Day of March, 1992

Attest:

HARRY F. MANBECK, JR.

*Attesting Officer*         *Commissioner of Patents and Trademarks*